H. W. TUFTS.
TROLLEY TENDER.
APPLICATION FILED AUG. 11, 1915.

1,173,623.

Patented Feb. 29, 1916.

Inventor
Harry W. Tufts
by Jas. H. Churchill
Atty.

UNITED STATES PATENT OFFICE.

HARRY W. TUFTS, OF NORTH ATTLEBORO, MASSACHUSETTS, ASSIGNOR TO CHARLES N. WOOD, OF QUINCY, MASSACHUSETTS.

TROLLEY-TENDER.

1,173,623.  Specification of Letters Patent.  Patented Feb. 29, 1916.

Application filed August 11, 1915. Serial No. 45,042.

*To all whom it may concern:*

Be it known that I, HARRY W. TUFTS, a citizen of the United States, and a resident of North Attleboro, in the county of Bristol and State of Massachusetts, have invented an Improvement in Trolley-Tenders, of which the following description, in connection with the accompanying drawings, is a specification, like characters on the drawings representing like parts.

This invention relates to trolley tenders such as now commonly used on electric cars employed in overhead electric railway systems, and which are usually provided with a spring-actuated drum or reel upon which the trolley rope is wound.

The present invention has for its object to simplify and improve trolley tenders, whereby their life and usefulness is prolonged and the cost of maintaining them in operative condition is materially lessened.

To this end the casing containing the spring-actuated drum or reel, is provided within it with a substantially circular central opening and a slot extended away from said central opening. The reel or drum has pivoted to it one or more levers or dogs, each having at its free end a projection which is extended into the said central opening and under normal conditions travels in a circular path in said opening, but which is adapted to be moved outwardly into the slot communicating with said opening to arrest rotation of the drum in the direction to unwind the trolley rope under abnormal conditions, as will be described.

The particular features of the invention will be pointed out in the claims at the end of this specification.

Figure 1:
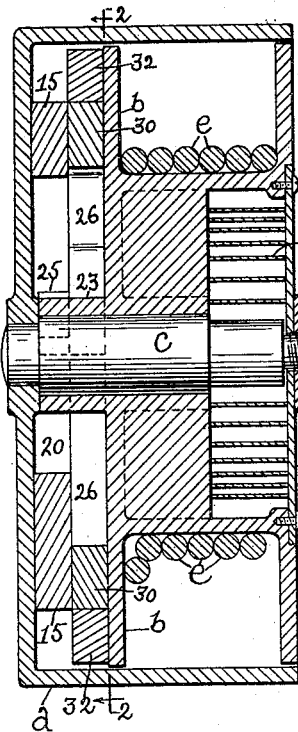
Figure 2:
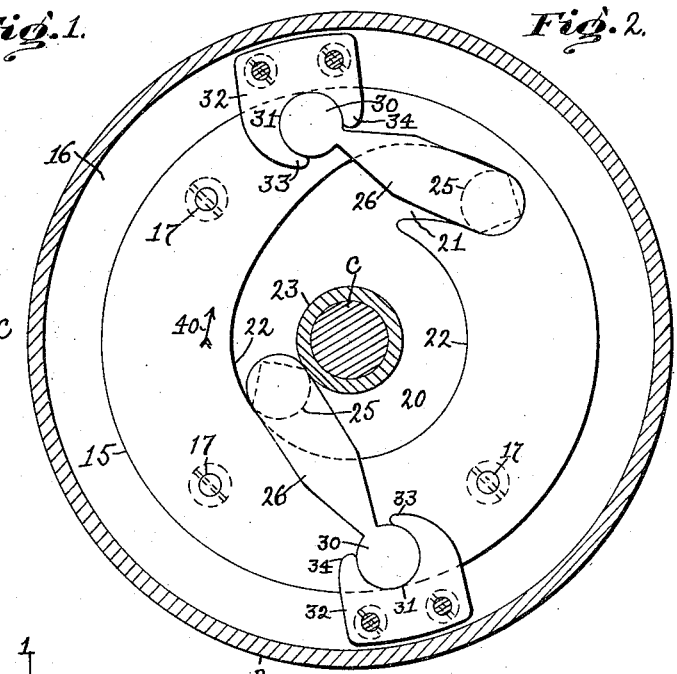
Figure 3:
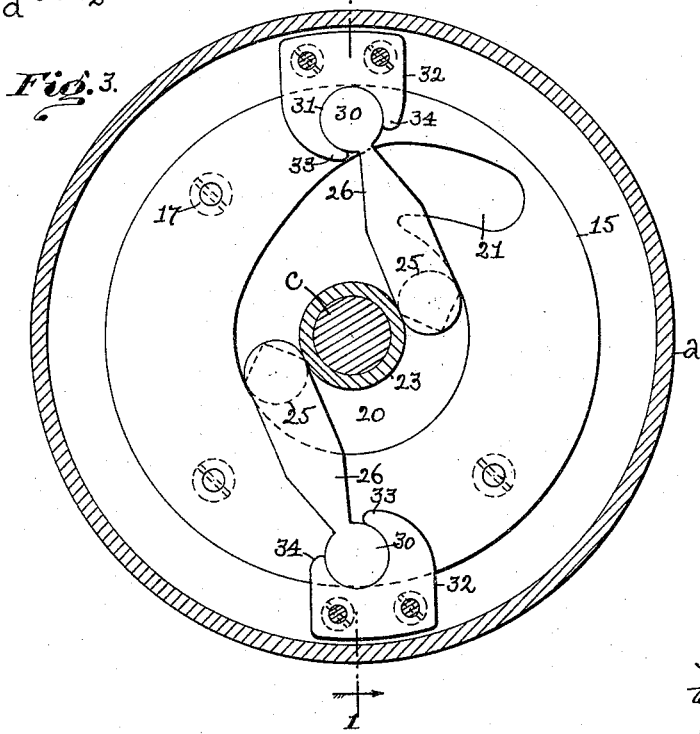

Figure 1 is a vertical central section of one form of trolley tender embodying this invention, taken on the line 1—1, Fig. 3. Fig. 2, a section on the line 2—2, Fig. 1, with one of the locking dogs or levers in its operative or locking position, and Fig. 3, a like section showing the dogs or levers in their normal or unlocked position.

Referring to the drawings, $a$ represents a casing, containing a drum or reel $b$ mounted to turn on a shaft or pin $c$, and rotated in one direction by a spring $d$ so as to wind on the drum or reel a trolley rope $e$. The casing $a$ is provided with a removable cover or face plate 10 secured in operative position by a washer 12 and nut 13. The parts as thus far described are and may be such as exist in trolley tenders now employed on the cars of electric street railways.

In accordance with the present invention, the casing $a$ contains within it a disk, plate or ring 15, which may be detachably fastened to the rear face plate 16 by screws 17, or said disk, plate or ring 15 may be cast integral with the casing. The disk, plate or ring 15 is provided with a central substantially circular opening 20 from which leads a slot 21 which is eccentric to said opening. The circular wall 22 of the opening 20 coöperates with the hub 23 of the drum or reel $b$ to form a circular path into which is extended a projection 25 on the free end of one or more locking levers or dogs 26, which are pivotally secured at their opposite ends to the rear face of the drum or reel $b$. The projection 25 is of suitable size to enter the slot 21, which is preferably provided with an inlet mouth of greater width than the projection 25 to facilitate passage of said projection into the slot 21.

Under normal conditions of use, the drum or reel is turned by the spring $d$ on the stud shaft or center pin $c$ to take up slack in the trolley rope $e$, and is turned in the opposite direction to pay out the rope by the usual trolley base spring (not shown), but which is used to keep the trolley wheel in contact with the trolley wire in a manner well understood. When, however, the trolley wheel jumps or leaves the wire, the trolley pole is suddenly elevated by the trolley base spring, and the drum or reel $b$ is rotated rapidly or at an increased speed in the direction of the arrow 40 in Fig. 2, and centrifugal force tends to throw the free end of the lever 26 outwardly and keep it in engagement with the outer wall 22 of the opening 20 until the projection 25 meets the outer wall of the cam-shaped slot 21, whereupon the projection 25 is directed into the slot 21 and meeting the end wall thereof arrests rotation of the reel and prevents further upward movement of the trolley pole and the wheel carried thereby.

The projection 25 is designed to engage the end wall of the slot 25 before the trolley wheel can be elevated above the trolley wire a sufficient distance to do damage to the overhead line construction.

After the reel or drum $b$ has been arrested in its rotation as described, the trolley pole is lowered and replaced on the trolley wire in the manner now commonly practised, and the reel or drum is revolved by the spring $d$ in the direction opposite to that indicated by the arrow 40, with the result that the projection 25 is carried back out of the cam slot 21 into the central opening 20, with the free end of the lever 26 resting on the hub 23 of the reel, as represented in Fig. 3.

When the locking dogs or levers are in the position represented in Fig. 3, the reel $b$ can be rotated to pay out the trolley rope and to take up slack therein, without having its rotation arrested by the said levers or dogs, for at such time the projections 25 merely travel in a circular path about the shaft $c$ as a center.

A single holding lever or dog 26 may be employed but it is preferred to employ a plurality of such dogs or levers as herein represented.

Provision is made for quickly and easily pivoting the locking levers or dogs 26 to the reel, and for this purpose each lever or dog is provided with a substantially circular disk-shaped head 30 at its end opposite to the projection 25, which is designed to be dropped into a socket 31 in a block 32 provided with jaws 33, 34, which are separated a sufficient distance to permit of a limited pivotal movement of the locking levers or dogs.

The disk, plate or ring 15 may be affixed to the casings $a$ of the trolley tenders now in use, and such tenders changed to the present form at a minimum expense.

It will be observed that the use of springs in connection with the dogs or levers 26 is avoided, and liability of the trolley tender becoming inoperative by breaking of such springs is avoided, also the cost of repairs and maintenance is reduced to a minimum.

Claims.

1. In an apparatus of the character described, in combination, a casing, a drum or reel rotatably mounted in said casing, a disk within said casing having a substantially circular opening and a slot leading from said opening, and a lever pivoted to said reel or drum and having a projection extended into said circular opening and normally movable therein and capable of being moved into said slot to arrest rotation of said drum or reel under abnormal conditions.

2. In an apparatus of the character described, in combination, a casing, a drum or reel rotatably mounted in said casing, a disk within said casing having a substantially circular opening and a slot leading from said opening, a socketed jaw attached to said reel, a lever having a substantially circular head capable of being inserted into the socket of said jaw and provided at its free end with a projection extended into said circular opening and capable of being moved into said slot to arrest rotation of said drum or reel under abnormal conditions.

3. In an apparatus of the character described, in combination, a casing, a reel or drum rotatable in said casing, means within said casing for forming a substantially circular opening and a slot extended from said opening and communicating therewith, and a locking dog or lever pivotally connected with said drum or reel and provided with a projection normally extended into said substantially circular opening and movable therein under normal conditions of use and capable of being moved into said slot by an increased rate of rotation of said drum or reel in one direction under abnormal conditions of use.

In testimony whereof, I have signed my name to this specification.

HARRY W. TUFTS.